United States Patent Office 3,248,409
Patented Apr. 26, 1966

3,248,409
POLYVALENT METAL SALTS OF CARBOXY-ALKYL POLYSILOXANES
Ben A. Bluestein, 2037 Hover Road,
Schenectady, N.Y.
No Drawing. Original application Aug. 15, 1960, Ser. No. 49,429. Divided and this application Sept. 16, 1965, Ser. No. 487,905
5 Claims. (Cl. 260—414)

This application is a division of my copending application Serial No. 49,429, filed August 15, 1960, and assigned to the same assignee as the present invention.

The present invention relates to novel salts of carboxyalkylorganopolysiloxanes and to a process for making them. More particularly, the present invention relates to polyvalent metal salts of carboxyalkylorganopolysiloxanes and to the use of such salts for improving the surface properties of various materials, particularly for rendering the surfaces of various materials water repellent.

The novel salt compositions of the present invention, hereinafter referred to sometimes as "carboxyalkylpolysiloxane salts," can be represented by the formula (1)
$$[M]_{\frac{a}{n}}\left[(OOCC_mH_{2m})_a\overset{(R)_b}{\underset{|}{Si}}O_{\left(\frac{4-a-b}{2}\right)}\right]$$

where M is a polyvalent metal, $n$ represents the valence number of the polyvalent metal and is an integer equal to from 2 to 4 inclusive, $a$ is equal to 0.001 to 1.0, $b$ is equal to 0 to 2.0 and the sum of $a$ and $b$ is equal to 1.00 to 2.5, $m$ is an integer equal to from 1 to 17, R is a member selected from the class of monovalent hydrocarbon radicals, halogenated monovalent hydrocarbon radicals, and a mixture of radicals consisting of at least one of the aforementioned members and up to 20 mole percent of cyanoalkyl radicals.

The novel salt compositions of Formula 1 are prepared by reacting a carboxyalkylorganopolysiloxane corresponding to the following formula, (2)
$$H(OOCC_mH_{2m})_a\overset{(R)_b}{\underset{|}{Si}}O_{\left(\frac{4-a-b}{2}\right)}$$

where $a$, $b$, $m$, and R are as defined in Formula 1 with a polyvalent metallic compound corresponding to the formula, (3) $\quad MZ$ where M is as defined in Formula 1, and Z is an organic or inorganic anion.

Included within the radicals represented by R of Formula 1 are aromatic and chloroaromatic, such as phenyl, chlorophenyl, tolyl, naphthyl, etc.; aliphatic and chloroaliphatic such as alkyl, cycloalkyl, chloroalkyl, akenyl and alkynyl, particularly methyl, ethyl, propyl, butyl, cyclohexyl, chloroethyl, vinyl, allyl, etc. The R radicals can be all the same radical or a mixture of any two or more of said radicals. The R radicals also can be a mixture of two or more of the aforementioned radicals and up to 20 mole percent of cyanoalkyl radicals such as cyanoethyl, cyanopropyl, cyanobutyl, cyanopentyl, cyanodecyl, cyanoundecyl, cyanopalmito, etc. Where the R radicals are cyanoalkyl radicals, the R radicals can be all the same cyanoalkyl radical or a mixture of any two or more cynoalkyl radicals. R is preferably methyl, phenyl, chlorophenyl; and where R is a cyanoalkyl radical, R is preferably cyanoethyl.

In general, any polyvalent metallic compound, illustrated by Formula 3 is operable, but polyvalent metallic compounds that are capable of being dissolved in conventional inert solvents such as water, various organic solvents, etc. are preferred.

The metallic component shown in Formula 3 as M, of the polyvalent metallic compound can be any metal of group Ib, IIa, IIb, IIIa, IVa, IVb, Va, VIIb, and VIII of the Periodic Table. The only limitation that has been definitely established as to the nature of the metallic component is that it has to be polyvalent i.e., have a valence of 2 or more. Specific examples of M in Formula 3 are zirconium, titanium, strontium, tin, lead, cobalt, aluminum, copper, zinc, cadmium, calcium, barium, magnesium, manganese, iron, nickel, and antimony.

The anion, or non-metallic component of the polyvalent metal compound, represented as Z in Formula 3 can be any organic or inorganic anion. Suitable anions are any inorganic or organic acids such as carboxylic acids containing from 1 to 20 carbon atoms, anions from halogen acids, sulfur containing acids, nitrogen containing acids, etc. In addition, oxides, hydroxides, carbonates and organic compounds other than the previously mentioned carboxylic acids that have active hydrogen radicals and are capable of reacting with polyvalent metal are also operable such as alcohols, mercaptans, etc. Particular examples of Z are chloro, sulfate, nitrate, acetate, acetylacetonate, oxide, hydroxide, carbonate, etc.

The carboxyalkylorganopolysiloxanes of Formula 2 hereinafter referred to sometimes as "carboxyalkylpolysiloxanes" or "the curable polysiloxane" can be conveniently prepared by the procedure shown in French Patent 1,158,808. In addition, the method of the Bluestein Patent 2,900,363 also can be employed by effecting hydrolysis of a suitable cyanoalkylorganochlorosilane either alone or along with another organochlorosilane in the presence of aqueous hydrochloric acid of at least 20 weight percent concentration. Suitable cyanoalkylorganochlorosilane can be prepared in accordance with the procedure of French Patent 1,118,500 and Patent 2,913,472, Prober. The hydrolysis product prepared in accordance with the Bluestein patent can be further equilibrated with other polysiloxanes such as octamethylcyclotetrasiloxane.

The carboxyalkylpolysiloxanes employed in the practice of the present invention preferably contain the following carboxyalkylsiloxy unit, (4)
$$HOOCCH_2-CH_2-\overset{(R')_c}{\underset{|}{Si}}O_{\frac{3-c}{2}}$$

intercondensed with one or more of the following siloxy units,

| | |
|---|---|
| (5) | $(R)_2SiO$ |
| (6) | $(R)_3SiO_{1/2}$ |
| (7) | $RSiO_{3/2}$ | where $c$ is a whole number equal to from 0 to 2, inclusive, R is as defined in Formula 1 and R' is a member selected from the class of monovalent hydrocarbon radicals and halogenated monovalent hydrocarbon radicals. A preferred range of the carboxyalkyl siloxy units represented by Formula 4 in the carboxyalkylpolysiloxanes of Formula 2 is 0.1 mole percent to 10 mole percent based on the total number of siloxy units contained in said carboxyalkylpolysiloxane, said siloxy units being characterized by having organo radicals attached to silicon by carbon-silicon linkages and having an average ratio in the range of from 1 to 2.5 organo (including carboxyalkyl) radicals per silicon atom.

The present invention is based on the discovery that a permeable substrate such as cotton or masonry, can be rendered substantially water repellent by treating the surface of the substrate with a mixture of carboxyalkylpolysiloxane and a polyvalent metallic compound, and thereafter heating the surface of the treated substrate to a temperature sufficient to effect the in situ formation of a carboxypolysiloxane salt.

Although the mechanism by which water repellency is imparted to the surface of a treated substrate by the in situ formation or "cure" of the novel salt compositions of Formula 1 is not definitely known, a possible explanation may lie in what is believed to be a cross-linking effect between the carboxyalkyl radicals of the carboxyalkylpolysiloxane and the polyvalent metal. For example, it has been observed that while a fabric treated with a carboxyalkylpolysiloxane salt formed with a polyvalent metal compound such as a zirconium salt exhibits a satisfactory degree of water repellency, little water repellency is noted when the same fabric is treated with a carboxyalkylpolysiloxane salt formed with a monovalent metallic compound such as a sodium salt.

In accordance with the present invention there is provided a process for rendering permeable substrates substantially water repellent comprising treating the surface of the substrate with a carboxyalkylpolysiloxane corresponding to Formula 2 and an effective amount of a polyvalent metal compound corresponding to Formula 3, thereafter heating the resulting treated product sufficiently to effect a reaction between said polyvalent metal compound and said carboxyalkylpolysiloxane.

Permeable substrates that have been successfully rendered water repellent in accordance with the practice of the present invention are fibrous materials such as natural and synthetic texiles including cotton, rayon, Orlon, nylon, etc. Additionally, paper, asbestos, leather and porous structures such as masonry have also been successfully treated. In addition to imparting water repellency to various premeable materials, substrates such as paper are rendered adhesive.

The carboxyalkylpolysiloxane salts of the present invention can also be used as emulsifiers, drilling muds, soil conditioners, coating materials, impregnants, floor polishes, plasticizers, fungicides, and in imparting antistatic properties to various materials.

In the practice of the invention, a suitable permeable substrate is treated with the carboxyalkylpolysiloxane and the polyvalent metal compound referred to hereinafter, sometimes as the curable polysiloxane and the curing catalyst, respectively. When the curable polysiloxane and the curing catalyst are employed together as a mixture to treat the substrate, the term "curable mixture" is used. It is sometimes expedient however, to treat the permeable substrate separately with the curable polysiloxane followed by treatment with an effective amount of the curing catalyst.

It has been found convenient when applying the curable mixture to the permeable substrate to employ a suitable solvent for the ingredients so that the curable mixture can be easily applied to the permeable substrate by well known procedures such as spraying, dipping and the like. Suitable solvents are benzene, ethyl acetate, trichloroethylene or any other suitable inert solvent. A suitable inert solvent is any solvent that is inert to the solute and whose solvent power is sufficient to provide for the preparation of a treating solution of a satisfactory concentration.

When the curing catalyst is a polar material such as copper nitrate, it often becomes necessary to employ a two step procedure to treat the permeable substrate. For example, the curable polysiloxane will usually be dissolved in a non-polar solvent while water can be employed as a solvent for the polar curing catalyst. In the two step procedure, the permeable substrate can be treated initially with an organic solvent solution of the curable polysiloxane and, when the solvent has evaporated, the treated substrate can be further treated with an aqueous solution of the curing catalyst.

The carboxyalkylpolysiloxane salt compositions of the present invention that are formed in situ on the surface of the treated substrate impart water repellency to the treated substrate even though the treating solutions containing the curable mixture of ingredients are employed in high dilutions. For example, water repellency is imparted to a treated substrate even if treating solutions containing as little as 0.1% solids are employed.

At least a stoichiometric amount of curing catalyst in terms of polyvalent metal, equivalent to the mole percent of carboxyalkyl siloxy units based on the total number of organosiloxy units in the curable polysiloxane, should be employed for maximum water repellency. If the one step treating method is employed to treat the substrate, such as when using a single solvent mixture of the curing catalyst and the curable polysiloxane, stoichiometric amounts of the ingredients in the curable mixture can be employed. In the two solvent treating method, generally excessive amounts of the curing catalyst are deposited during the second treating step on the curable polysiloxane treated substrate. Any excess amounts of unreacted materials can be easily removed by washing after heat curing the treated substrate surface. In order to minimize the loss of the carboxyalkylpolysiloxane salt forming ingredients and to insure that at least an effective amount of the curing catalyst (which is an amount at least stoichiometric) is deposited on the surface of the treated substrate when the two step method is employed, the treating solutions should be employed at concentrations of at least about 1 percent to about 10 percent by weight of solids. If the two step method is employed to treat the substrate it has also been found expedient to employ the curable polysiloxane solution and the curing catalyst solution at about the same concentration to provide for an excess amount of the curing catalyst at all times. It is understood of course that depending on the nature of the substrate treated and such factors as the dip time, concentrations less than 1 percent and higher than 10 percent can be satisfactorily utilized by those skilled in the art in accordance with the procedures prescribed in the present invention.

Curing temperatures in the range of about room temperature, e.g., 25° C., to 200° C. can be utilized. A preferred curing temperature range is about 25° C. to 110° C. Depending on the temperature employed, maximum water repellency can be obtained in a few minutes or less, or many hours can be required.

In order that those skilled in the art will be better able to practice the invention, the following examples are given by way of illustration and not by way of limitation. All parts are by weight.

EXAMPLE 1

Over a ten minute period 94 parts of β-cyanoethyltrichlorosilane was added with stirring to 225 parts of concentrated aqueous HCl. To the clear solution that was obtained there was added sufficient NaOH to bring the pH up to 5. The reaction product was recovered with ethanol. A hard resinous product was obtained which consisted essentially of recurring

$HOOCCH_2CH_2SiO_{3/2}$ units. This product was free of cyano radicals as determined by the infrared analysis.

There was equilibrated with 20 parts of the resin prepared above, 290 parts of octamethylcyclotetrasiloxane and 20 parts of hexamethyldisiloxane in the presence of 3 parts of 87% concentrated sulphuric acid. The resulting product was stripped of its volatiles and a curable polysiloxane fluid was obtained which contained about 5 mole percent of β-carboxyethyl siloxy units

$HOOCCH_2CH_2SiO_{3/2}$ based on the total number of siloxy units.

A 2% solution of the above curable polysiloxane in ethyl acetate was prepared. A cotton cloth was dipped into the ethyl acetate solution and the treated cloth was then squeezed and air-dried. No water repellency was noted when water was sprayed on the treated cotton cloth.

The treated cloth was then dipped into a 2% aqueous zirconium acetate solution, and then the cloth was squeezed and dried at 120° C. for 5 minutes. The resulting cloth was found to have a substantial degree of water repellency.

EXAMPLE 2

In accordance with the procedure of Example 1, 8" x 8" strips of cotton and rayon, respectively, were dipped into the 2% solution of the curable polysiloxane in ethyl acetate solvent of Example 1. The strips were then air-dried and then dipped into a 2% aqueous zirconium acetate solution. Both strips were cured at 160° C. for five minutes. The treated cotton and rayon strips were evaluated for water repellency.

An additional cotton and rayon strip are similarly treated with the 2% ethyl acetate solution of the curable polysiloxane but a 2% potassium acetate solution is used as the curing catalyst in place of the zirconium acetate. Cotton and rayon control strips are also treated with the 2% ethyl acetate solution of the curable polysiloxane without a subsequent treatment with a metal salt solution.

Table A shows the results of a spray rating test that was conducted in accordance with the standards prescribed by the American Association of Textile Chemists and Colorists to determine the water repellency of the treated strips.

All the strips in Table A were initially treated with the curable polysiloxane in ethyl acetate. When the ethyl acetate solvent evaporated, some of the strips were treated with a 2% aqueous salt solution and then heated for 5 minutes at 160° C. The term "Metal Treating Solution" in Table A represents the 2% solution containing the particular metal ions that were present in the aqueous treating solution. All the treated substrates were dry cleaned by immersion in mineral spirits and then laundered with a standard detergent for about 15 minutes. In Table A are listed the initial spray ratings and the spray rating after dry cleaning and after laundering for the strips that had been treated with the salt solutions.

*Table A*

| Substrate | Metal Treating Solution | Initial Spray Rating | Dry Cleaned | Laundered |
|---|---|---|---|---|
| Cotton | Zirconium | 80–100 | 70–80 | 70 |
|  | Potassium | 0 | 0 | 0 |
|  | None (Control) | 0 | 0 | 0 |
| Rayon | Zirconium | 80–100 | 70–80 | 70 |
|  | Potassium | 0 | 0 | 0 |
|  | None (Control) | 0 | 0 | 0 |

The above results clearly show the valuable and unexpected properties of the carboxyalkylpolysiloxane salts of the present invention.

EXAMPLE 3

A series of carboxyethylmethylpolysiloxane solutions were prepared in benzene at a 5% concentration. Methyl-β-cyanoethyldichlorosilane was initially synthesized in accordance with the teachings of Patent 2,913,472, Prober. The product was then hydrolyzed in accordance with the Bluestein method and the resulting hydrolyzate was divided into three parts and each part was equilibrated with octamethylcyclotetrasiloxane and hexamethyldisiloxane in a manner similar to that shown in Example 1. The resulting curable polysiloxane fluids contained 0.4 mole percent of methyl-β-carboxyethylsiloxy units, 1.5 mole percent of methyl-β-carboxyethylsiloxy units and 6 mole percent of methyl-β-carboxyethylsiloxy units, respectively, based on the total number of siloxy units in each fluid, as determined by infrared analysis. For example, the formula for the fluid containing 6 mole percent of methyl-β-carboxyethylsiloxy units was as follows:

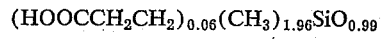

Each of the three solutions at 5% concentration of the curable polysiloxane in benzene was subdivided into 10 parts. Into each part there was added a stoichiometric amount of the curing catalyst in the form of a polyvalent metallic acetylacetonate. Strips of paper were then dipped into each of the resulting solutions and the treated strips were cured at 100° C. for five minutes. Other strips were treated with the curable polysiloxane solutions free of the metal acetylacetonate curing catalyst and similarly heat treated.

The treated paper substrates were tested for water repellency by a qualitative spray rating test involving visual observation of the manner by which water droplets ran off the treated substrate or were absorbed on the treated substrate.

Table B shows the mole percent methyl-β-carboxyethylsiloxane units in the various solutions of the curable polysiloxane and the various metals (followed by a valence number) which were added in the form of an acetylacetonate to the respective solutions of the curable polysiloxane in stoichiometric amounts. The letter "E" in the table signifies excellent water repellency corresponding to about a 90–100 spray rating, while "G" represents good water repellency, equivalent to about a 70–80 spray rating.

*Table B*

| Mole, percent | Fe (III) | MN (II) | Al | Co (II) | Zr | Cr (III) | Ti (IV) |
|---|---|---|---|---|---|---|---|
| 0.4 | G | G | E | G | G | G | E |
| 1.5 | G | G | E | G | G | G | E |
| 6.0 | E | E | E | G | E | G | G |

In addition to the metals listed in Table B, nickel, magnesium and vanadium acetylacetonates were also found to be effective in increasing the water repellent properties of the treated paper strips. The strips that were treated with the curable polysiloxane containing no polyvalent metal acetylacetonate exhibited no water repellency.

A cotton strip was also treated with the solution of the curable mixture of the curable polysiloxane having 6 mole percent of methyl-β carboxyethylsiloxy units and a stoichiometric amount in terms of polyvalent metal of zirconium acetylacetonate and the treated strip was heat cured. The cotton strip was found to have excellent water repellency.

A standard potassium bromide disc is prepared containing 10% by weight of the above treated cotton substrate. An infrared spectrum taken of the disc, together with the method of preparation, shows that the carboxypolysiloxane salt that is formed in situ on the treated cotton substrate has the formula,

EXAMPLE 4

β-Trichlorosilylundecylnitrile is prepared by the method illustrated in patent 2,913,472, Prober, by the slow addition of an equimolar amount of trans-2-undecenitrile to trichlorosilane in the presence of 5% by weight, based on the weight of the reactants, of tributylamine. The mixture is refluxed for 24 hours and the residue is vacuum distilled.

The resulting cyanoalkyltrichlorosilane is hydrolyzed in water with an equal weight of a mixture consisting of 1.5 moles dimethyldichlorosilane to 1 mole trimethylchlorosilane. The resulting hydrolyzate is further hydrolyzed for about two hours in hydrochloric acid in accordance with the Bluestein method. The final product is a resinous material having an R to Si ratio of about 1.7, and further characterized by containing about 20 mole percent of $(C_8H_{17})(HOOC)CHCH_2SiO_{3/2}$ units, 9 mole percent of $(C_8H_{17})(NC)CHCH_2SiO_{3/2}$ units, and a balance of about 71 mole percent of dimethylsiloxane and trimethylsiloxane units.

The above hydrolysis product is equilibrated in the presence of 3 parts of sulphuric acid at 87% concentration with a mixture of octamethylcyclotetrasiloxane and hexamethyldisiloxane in a ratio of two parts of said mixture to one part of the hydrolysis product where said mixture comprises a mole ratio of 10 to 1 of octamethyldisiloxane to hexamethyldisiloxane. The resulting product is stripped at 0.1 mm., and is found to contain 5 mole percent of β-carboxyethylsiloxy units based on the total number of siloxy units in the resulting curable polysiloxane.

A 5% solution of the above curable polysiloxane is prepared in benzene. A stoichiometric amount of zirconium acetylacetonate is added to the benzene solution. A strip of cotton is dipped into the resulting solution and the solvent is allowed to evaporate. The resulting treated strip is then heated to 100° C. for 5 minutes. The treated strip is subjected to a qualitative water repellency test and found to possess substantial water repellency.

A standard potassium bromide disc is prepared containing 10% by weight of the treated cotton substrate. The formula of the carboxypolysiloxane salt that is formed on the treated cotton substrate is as follows, based on infrared analysis and the method of preparation,

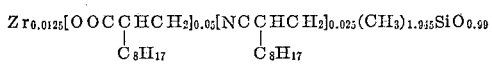

While the foregoing examples have of necessity been limited to only a few of the very many variables within the scope of the present invention, it should be understood that the present invention covers a broad class of carboxypolysiloxane salts which comprise broadly the products of reaction of the carboxypolysiloxane compositions of Formula 2 and the polyvalent metal compound of Formula 3. All of these various materials are prepared by methods specifically illustrated in the examples above and described further in the foregoing description of the present invention.

The examples have of necessity been directed to only a few of the many process variables which are practicable in the practice of the process of the present invention. It should be understood, however, that the process of the present invention is illustrated by both the specific examples given as well as by the detailed description of the present invention which preceded these examples.

What I claim as new and desire to secure by Letters Patent of the United States is:

1. A composition corresponding to the formula,

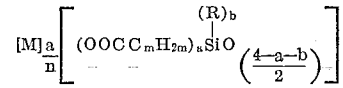

where M is a polyvalent metal, $n$ represents the valence number of the polyvalent metal and is an integer equal to from 2 to 4, inclusive, $a$ is equal to 0.001 to 1.0, $b$ is equal to 0 to 2.0, and the sum of $a$ and $b$ is equal to 1.00 to 2.5, $m$ is an integer equal to from 1 to 17, R is a member selected from the class consisting of monovalent hydrocarbon radicals, halogenated monovalent hydrocarbon radicals, and a mixture of radicals consisting of at least one of the aforementioned members and up to 20 mole percent of cyanoalkyl radicals.

2. A composition in accordance with claim 1, where M is titanium.

3. A composition in accordance with claim 1, where M is zirconium.

4. A composition in accordance with claim 1, where M is aluminum.

5. A composition in accordance with claim 1, where M is zinc.

No references cited.

CHARLES B. PARKER, *Primary Examiner.*

ANTON H. SUTTO, *Assistant Examiner.*